June 24, 1930.  A. H. JESSEN  1,766,823
MULTIPLE POWER CLUTCH
Filed May 7, 1928

INVENTOR.
A. H. JESSEN.
Fred H Hayn
ATTORNEY

Patented June 24, 1930

1,766,823

UNITED STATES PATENT OFFICE

ARNOLD H. JESSEN, OF LOS ANGELES, CALIFORNIA

MULTIPLE-POWER CLUTCH

Application filed May 7, 1928. Serial No. 275,873.

My invention relates to clutches, and more particularly to clutches adapted for special use in connection with transmission mechanism in which it is possible to run said mechanism idly, to provide for a direct drive, or to multiply its power, or make brake application, although in its broader aspects it is not to be limited to such mechanisms.

It accordingly is an object of my invention to provide a novel form of multiple power clutch comprising a set of drums associated with a driving and driven member, mechanism being associated with said drums and said members whereby neutral position may be provided for, a direct drive from said driving member to said driven member, or the power developed by said driving member may multiply the power of said driven member, it being also possible to make brake application with said clutch.

The above and further objects and advantages of my invention, as will hereinafter more fully appear, I attain by the novel construction described in the specification and illustrated on the drawings, forming a part of my application.

Figure 1:
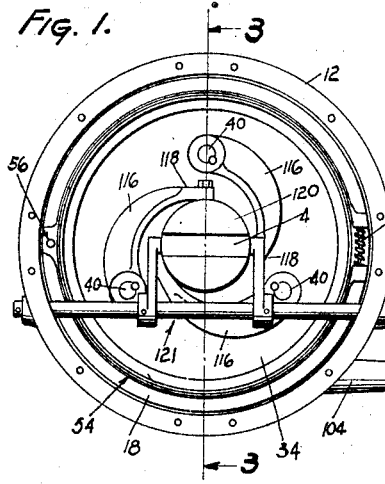
Figure 2:
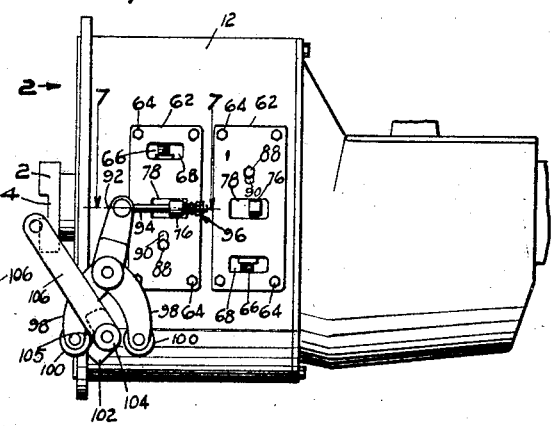
Figure 4:
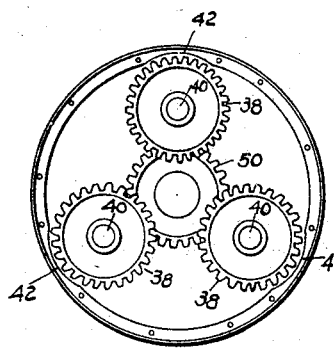
Figure 3:
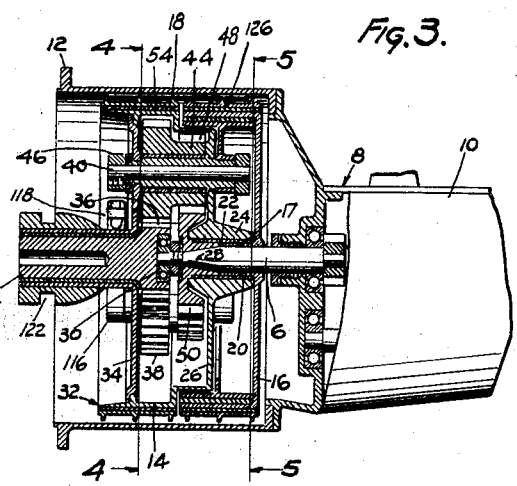
Figure 5:
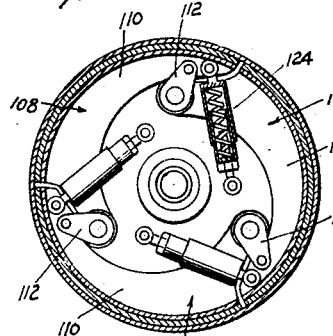
Figure 7:
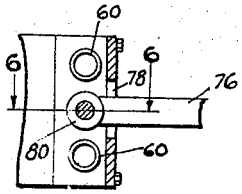
Figure 8:
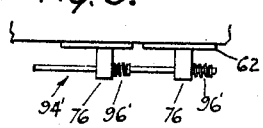
Figure 6:
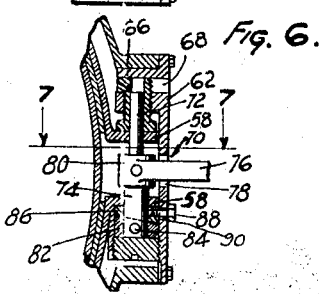

Reference is had to the accompanying drawings, in which similar reference characters denote similar parts. In the drawings, Fig. 1 is an end elevational view, looking from the left in Fig. 2, Fig. 2 is a fragmentary side elevational view of my invention applied to a transmission mechanism, Fig. 3 is a cross-sectional view, taken on the line 3—3, Fig. 1, Fig. 4 is a cross sectional view, taken on the line 4—4, Fig. 3, looking in the direction of the arrows, Fig. 5 is a cross-sectional view, taken on the line 5—5, Fig. 3, Fig. 6 is an enlarged, fragmentary similar view, taken on the line 6—6, Fig. 7, Fig. 7 is a similar view, taken on the line 7—7, Fig. 6, and Fig. 8 is a fragmentary top elevational view of a modification in which two of the clutches may be operated simultaneously.

Describing my invention more in detail, the numeral 2 indicates the driving member or drive shaft, to which may be coupled by means of the slot or cut-away portion 4 the source of power, such as the shaft of a motor, the rotation of the drive shaft 2 being communicated by a mechanism presently to be described, to a driven shaft 6 of the conventional or other form of transmission 8 in the casing 10, to which casing the housing 12 may be secured in any suitable way. Since said transmission forms no part of my invention, except in combination thereof, it need not be further described.

In the housing 12 are positioned the drums 14 and 16, the latter having an inwardly extending hub 17, surrounding the shaft 6 and is splined thereto, a bushing 22, if desired, surrounding said hub 17, on which bushing is mounted the tapered thickened portion 24 of the partition 26 of the drum 14, which partition, when the mechanism is assembled, is positioned in the drum 16.

The driven shaft 6 is preferably tapered as at 28, which tapered portion is mounted for rotation in the bearing 30 mounted in the inner end of the drive shaft 2, the partition 26 being connected in any suitable manner with the inner casing 32 positioned within the drum 14, to which inner casing is secured in any preferred way the partition 34 in the drum 14.

Mounted on the drive shaft 2 is a sun gear 36 continually in mesh with the planet pinions 38, mounted on the partition 26 by means of shafts 40, the inner casing 32, if desired, being cut away or curved as at 42 to accommodate said pinions. (See Fig. 4.)

The planet pinions 38 (Fig. 3) have extensions 44 on the shafts 40, projecting within the drum 16, said shafts being secured in any suitable manner to the partitions 34 and 26 as by means of the parts 46, keyed or driven on said shafts, and the extensions 44 are preferably integral with the smaller planet pinions 48 in mesh with the sun gear 50 splined on the tapered portion 28 of the driven shaft 6 in any preferred way.

As seen more particularly in Figs. 1 and 3 a clutching means 54, provided with strengthening ribs 18, is positioned within the inner periphery of the casing 12 and surrounds the inner casing 32 containing the gears 36 and the pinions 38, which clutching means comprises a pair of suitable bands made of any preferred material, which bands are pivoted together as at 56 (Fig. 1), and are preferably formed of two parts, having flanges or extensions 58 (Fig. 6), between which is positioned the springs 60 (Figs. 1 and 7), which springs hold the flanges 58 of said clutching means or band 54 apart.

To cause the clutching means 54 to friction on the inner casing 32, so that the gears will function to multiply the power from the drive shaft 2 to the driving shaft 6, so that said driven shaft will operate at a lower speed than a direct drive from the drive shaft 2 to the driven shaft 6, the structure depicted more particularly in Figs. 6 and 7 is provided.

To this end the casing 12 is provided with a closure 62, secured thereto by any preferred means as the bolts 64, and said closure is provided with a flanged and screw-threaded sleeve 66, visible through the opening 68, the flange of said sleeve engaging one of the flanges 58 of the clutching means 54, and extending through said flanges and into the sleeve 66 is an operating member 70, provided with a reduced portion 72 and a thickened portion 74, which member is adapted to be oscillated by the extension 76, movable in the slot 78 in the closure 62, which extension is secured to the member 70 by any suitable means 80 (Figs. 6 and 7).

The portion 74 is preferably secured to a cam 82 by means of a bolt or other member 84, and as said member 70 is oscillated, said cam engages with a stationary complementary cam device 86, secured to the closure 62 by any suitable means as the adjustable bolt 88, adjustable in the slot 90, if desired.

By oscillating the extension 76, the cams 82 and 86 coact to bring the flanges 58 together against the action of the springs 60 (Figs. 1 and 7) to cause the clutching means 54 to engage the inner casing 32 so that the gearing hereinbefore described will function to multiply the power of the driven member 6.

The mechanism just described is adapted to be operated by a lever or pedal or any other preferred means through the structure shown in Figs. 1 and 2, which comprises a forked lever 92 associated in any preferred way with the rod 94, opposed by the nut and spring construction 96 (Fig. 2).

The forked lever 92 has associated therewith a pair of arms 98 provided with rollers 100 for selective engagement with the arms of the cam bell crank 102, pivoted to the casing 12 as at 104, the cam or cut away portion 105 (Fig. 2) when engaged by the left roller 100 the cam devices 82 and 86 are disengaged and hence in neutral position. Moving the bell crank 102 by the operating lever 106 to the right or left causes the cam devices 82 and 86 to function to engage or release the clutching means 54. This structure permits the gearing to idle or to coact to multiply the power or operate the shaft 6 at a lower speed than direct drive. When in neutral or idling position, the drums 14 and 16 rotate in opposite directions, the gears in both drums running idle.

The means for providing a direct drive from the drive shaft 2 to the driven shaft 6 will now be described. The drum 16 is provided with internal clutching means 108, preferably formed of any desired number of circular shoes in the form of bands, preferably three in number, connected to three arcuate members 110 by means of the levers 112 (Fig. 5), the inner ends of which levers are associated in any preferred way with the shafts 40 extending through the partitions 26 and 34 (Fig. 1), and are secured to three complementary arcuate members 116, their free ends 118 engaging a conical device 120 (Fig. 3) slidable on the shaft 2 and operable by a suitable shaft and lever construction 121 (Fig. 1) engaging the cutaway portion 122.

The three circular shoes 108 lock the two drums together so they rotate in unison for a direct drive when the conical member 120 is pushed outwardly as just described to actuate the members 116.

To overcome the centrifugal action of the arcuate members 110 (Fig. 5), the adjustable spring structure 124 is secured at one end to the partition 26, and the other end to each of said members. The shoes 108 are accordingly mechanically released by means of the conical member 120, said members being otherwise automatically engaged.

The drum 16 is provided with a service brake, preferably in the form of a band 126 to engage the inner periphery of said drum, which band is operable by the device 76 (right Fig. 2) operated by a foot brake lever, if desired.

In Fig. 8 I have shown a slight modification in which the clutch 54 and brake 126 may be operated simultaneously, the rod 94' having retarding springs 96', actuates the two devices 76 at the same time.

While I have thus described my invention with great particularity, it is clear that it may be modified throughout a wide range. I therefore do not propose to be limited to the exact details of construction shown and described, but reserve the right in practice to make any and all modifications thereof that fall within the scope of the appended claims.

I claim as my invention:

1. A multiple power clutch comprising a drive shaft, a driven shaft, a drum mounted on each end of said shafts, a slidable conical member on said drive shaft, interconnected means in both of said drums for transmitting the power developed by said drive shaft to said driven shaft, a set of friction shoes in one of said drums, means associated with each of said shoes for automatically holding them in engagement with said drum to lock said drums together so they will rotate in unison to transmit the movement of said drive shaft directly to said driven shaft, said conical member, when said shoes are released, being adapted to overcome the centrifugal action of said shoes, and means associated with said conical member whereby the latter may release said shoes.

2. A multiple power clutch including a drive and a driven shaft, a drum mounted on said drive shaft, a drum mounted on said driven shaft, clutching means positioned within said second drum whereby said drums may be locked together so they will run in unison, means on said drive shaft for operating said clutching means, means positioned in said first drum, and extending within said second drum for transmitting the movement of said drive shaft to said driven shaft, and means associated with said first drum for optionally rendering said last means operative or inoperative.

3. A multiple power clutch including a drive and a driven shaft, a drum mounted on said drive shaft, a drum mounted on said driven shaft, said first drum having an extension of smaller diameter than said second drum, projecting within said second drum, intermeshing gears, mounted on said drive shaft, said first drum, and said driven shaft for transmitting the movement of said drive shaft to said driven shaft, and sets of means external of said first drum, and internally positioned in said second drum for permitting said drums to rotate in opposite directions, said gears running idly or optionally to multiply the power of said driven shaft, and to run said drums in unison.

4. A multiple power clutch including a drive and a driven shaft, a drum on said drive shaft, a drum on said driven shaft, said first drum having an extension projecting within said second drum, a partition on said first drum, a partition on said extension in said second drum, a set of shafts mounted on said partitions and extending through said first drum, planet pinions mounted on said shafts, a sun gear on each of said drive and driven shafts in mesh with said pinions, a brake band on said first drum, means for clamping said band to said first drum, a service brake band on said second drum, means for clamping said band to said second drum, locking means, internally positioned with respect to said second drum for locking said second drum to said first drum, and means, slidable on said drive shaft for operating said locking means.

5. A multiple power clutch including a drive shaft, and a driven shaft, a drum mounted upon each of said shafts, said first drum having a reduced extension projecting into the other of said drums, a sun gear on each of said shafts, planet pinions mounted in said first drum and adapted to transmit the power from one of said sun gears to the other, means associated with said drums whereby said drums may be caused to rotate in opposite directions for neutral position or optionally to cause said gears and pinions to multiply the power from said drive shaft to said driven shaft, a set of frictional shoes in one of said drums, and means for operating said shoes to engage the internal periphery of said last mentioned drum, said shoes being adapted to lock said drums together to provide for high speed drive of said shafts.

6. A multiple power clutch including a drive and a driven shaft, a drum mounted on said drive shaft, a drum mounted on said driven shaft, clutching means positioned within said second drum whereby said drums may be locked together so they will run in unison, a conical device on said drive shaft for operating said clutching means, means positioned in said first drum, and extending within said second drum for transmitting the movement of said drive shaft to said driven shaft, means associated with said first drum for optionally rendering said last means operative or inoperative, and a service brake associated with one of said drums.

In testimony whereof I have signed my name to this specification.

ARNOLD H. JESSEN.